United States Patent [19]

Dawson

[11] Patent Number: 5,613,412

[45] Date of Patent: Mar. 25, 1997

[54] SLACK CHECK TOOL

[76] Inventor: Ronald A. Dawson, 20264 Dubois, Clinton Township, Mich. 48035

[21] Appl. No.: 540,992

[22] Filed: Oct. 11, 1995

[51] Int. Cl.⁶ .................................................. B25B 13/08
[52] U.S. Cl. ................... 81/484; 81/119; 7/100; 7/166
[58] Field of Search ............... 81/484, 485, 486, 81/488, 176.1, 176.15, 119; 7/100, 166, 138; 254/131

[56] References Cited

U.S. PATENT DOCUMENTS

| | | | |
|---|---|---|---|
| 4,625,353 | 12/1986 | Tamez et al. | 7/100 |
| 4,685,164 | 8/1987 | Sebalos | 81/463 X |
| 4,864,900 | 9/1989 | Kreikle et al. | 7/100 |
| 5,181,440 | 1/1993 | Jagt | 81/484 |
| 5,271,115 | 12/1993 | Senters | 81/484 X |

*Primary Examiner*—D.S. Mieslin

[57] ABSTRACT

A slack adjuster check tool includes a holding member formed of flanges to engage a slack adjuster and a retention hook and/or chain to hold the tool in place on a slack adjuster. The retention member is located between the holding member and the handle to allow the user to observe the slack by exerting force on the handle to determine how much freedom of movement there is in the slack adjuster. Openings are provided in the holding member to provide direct access to adjustment heads on slack adjusters.

13 Claims, 5 Drawing Sheets

SLACK CHECK TOOL

BACKGROUND OF THE INVENTION

Field of the Invention

This invention relates to the field of brake adjusting tools and particularly to tools for checking the slack in the mechanism that applies braking force in air brakes of the type that use an S-cam.

*The Air Brake Book* published by Chilton's Commercial Carrier Journal at Chilton Way, Radnor Pa. 19809 describes a number of models of foundation air brakes on which the check tool of this invention can be used.

A typical foundation air brake used on each wheel, or wheel-pair, of large vehicles includes an air chamber rigidly mounted on a non-rotating portion of an axle structure near one of the wheels. A piston within the chamber is moved in one direction by compressed air controlled by a valve operated by the driver of the vehicle to apply the brakes by means of a push rod attached to the piston and connected by a clevis to a lever, called a slack adjuster, mounted on one end of a cam shaft. This movement of the lever transmits torque through the cam shaft to rotate an S-shaped cam, or S-cam, rigidly mounted on the other end of the shaft. The S-cam transmits the force through cam-follower rollers supported at the ends of brake shoes to force the brake shoes apart and the brake pads mounted on them against the brake drum to brake the vehicle.

The brake shoes are set to move a certain minimum distance before the pads touch the drums, and this distance constitutes slack in the movement of the slack adjuster lever. As the brake drum and the pads wear, the lever has to move farther to apply the brakes, which increases the range of slack movement. This freedom of motion must be limited so that it does not exceed a certain maximum amount, and for that reason the lever includes means for adjusting its angular setting on the cam shaft relative to the orientation of the S-cam. Thus, the slack adjuster is not directly affixed to the cam shaft but is rotatably mounted on a worm gear that has internal splines mounted on splines on the end of the cam shaft to prevent the gear from rotating relative to the shaft. The lever can rotate on the worm gear only to a limited extent within a range determined by the engagement of gear teeth on the outer surface of the gear with a worm mounted in a fixed location within the slack adjuster lever. The worm is rotatable about its own axis, which is perpendicular to the axis of the cam shaft, and it has a polygonal head, which is usually hexagonal but is square on some slack adjusters and is accessible from outside the slack adjuster to permit the worm to be rotated on its axis by a socket wrench. Excess slack is taken up by rotating the head to adjust the angle of the lever to the proper position to cause the S-cam to begin to apply pressure to the roller followers after the outer end of the push rod extending from the air chamber has moved only a short distance, typically between ½" and ¾" from the position it occupies when the piston is not under pressure from compressed air.

Other slack adjusters are referred to as self-adjusting or automatic because they have sensors that detect the amount of slack and are connected to actuating means in the slack adjusting lever to rotate the worm to take up excess slack. However, even the automatic slack adjusters have provision for some manual adjustment.

The slack in each brake of a vehicle so equipped needs to be checked regularly to be sure that the brake shoes apply balanced pressure on the drums so that they can bring the vehicle to a halt without causing it to swerve or skid as it stops. In organizations that operate fleets of vehicles having air brakes, mechanics are required to inspect the brakes on a regular schedule, but in addition, the drivers are also supposed to check the slack adjusters at the beginning of each day's trip, if the slack adjusters can be reached. Such inspection requires getting under the vehicle far enough to be able to grasp the slack adjuster and to rotate it in the direction in which it is to pivot when the brakes are applied in normal operation of the vehicle. This can be an uncomfortable task in the wintertime, when the slack adjuster is likely to be icy cold, as well as in the summertime, when the vehicle and the pavement on which it sits are likely to be extremely hot, and drivers for truck fleets are frequently given gloves to protect their hands while manipulating the slack adjusters.

OBJECTS AND SUMMARY OF THE INVENTION

It is an object of this invention to provide means for checking the slack in the mechanism that transmits force from compressed air actuating means to the S-cam that actuates the brake shoes in each of the wheel brakes of large vehicles.

A further object is to facilitate the checking of slack so that it can be done more easily by drivers and mechanics than is now the case.

A further object is to provide means for checking and adjusting the slack while the tool is retained in place on the slack adjuster.

Those who are skilled in the technology with which this invention deals will recognize further objects after studying the following description.

In accordance with this invention, a slack adjuster check tool includes a holding member to engage one side of the slack adjuster at the end that houses the splined worm gear. The holding member has flange means spaced far enough apart to embrace part of the front and back surfaces of that end of the slack adjuster, and the holding member also has retention means, such as a hook or chain or both, to extend around to the other side of the slack adjuster at some distance from the end with the splined worm gear to hold the tool in place against the slack adjuster. The retention means is located between the part of the holding member that engages the slack adjuster and a handle that permits the person using the tool to pull it in the direction that would apply the brake. In so doing, the user can observe the slack, i.e., the distance the slack adjuster can be moved relatively freely before reaching a position in which further movement is stopped by engagement of the brake shoes with the drum. In order to hold the tool in place while adjustment is made to reduce any excessive slack, the two ends of the holding member are displaced from each other by an angle of about 90° so that the end remote from the handle can hook over the slack adjuster. Openings are provided in the holding member at the proper locations to provide direct access to the standard places where polygonal, usually hexagonal, adjustment heads are located on all models of slack adjusters.

DETAILED DESCRIPTION OF A PREFERRED EMBODIMENT

Figure 1:
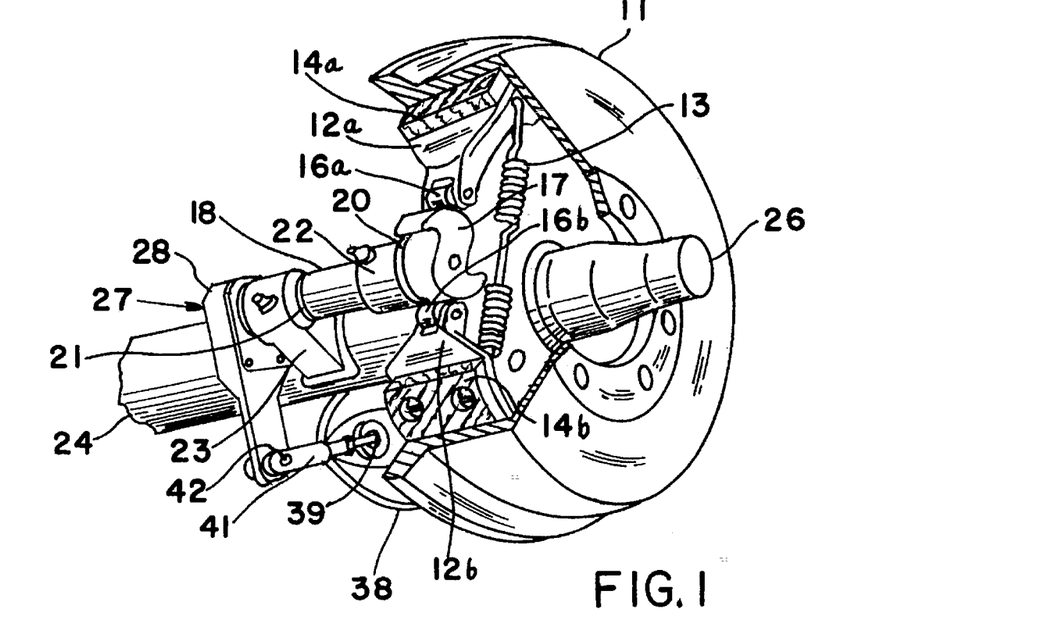
FIG. 1 is a perspective view of a fragment of a foundation brake system actuated by compressed air.
Figure 2:
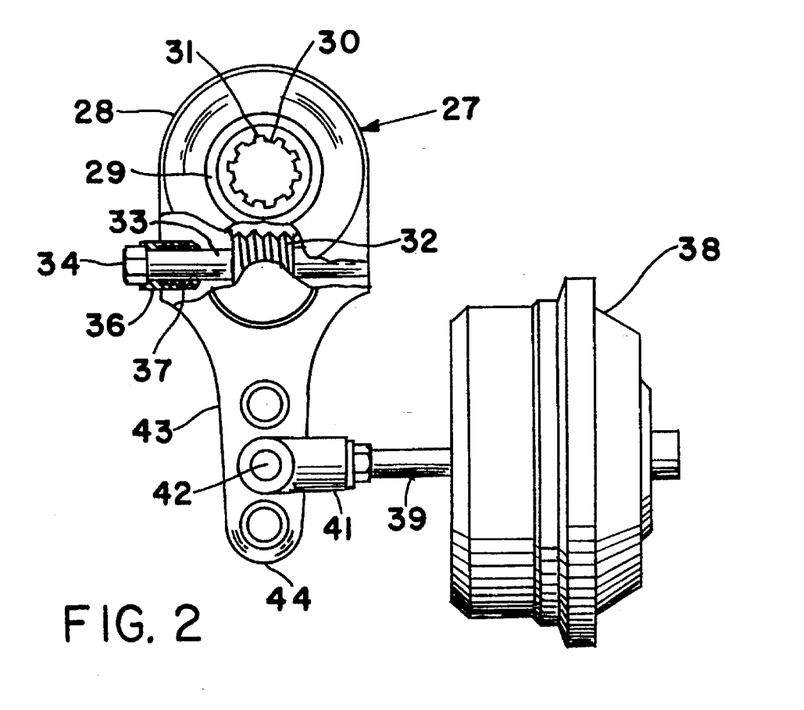
FIG. 2 is a side view, partly in cross section, of two of the main components of the brake system in FIG. 1, including a typical manual slack adjuster and one form of air chamber connected to it.

The brake assembly, or foundation brake as it is commonly called, in FIGS. 1 and 2 includes a brake drum 11 within which are two pivotally mounted brake shoes 12a and 12b, the free ends of which are pulled toward each other by a return spring 13 to pull the brake linings 14a and 14b mounted on the shoes 12a and 12b away from the inner cylindrical surface of the drum. Roller pins 16a and 16b rotatably mounted at the free ends of the shoes 12a and 12b serve as cam followers on opposite cam surfaces of an S-cam 17 and are pulled against the cam surfaces by the return spring.

The S-cam is rigidly mounted on one end of a cam shaft 18 rotatably supported in bushings 20 and 21 that, in turn, are supported on brackets 22 and 23 rigidly mounted on an axle housing 24 to hold the axis of the cam shaft parallel to the axis of an axle 26 on which the drum 11 is mounted. A slack adjuster 27 mounted on the other end of the cam shaft 18 from the S-cam 17 is basically a lever, one end 28 of which is enlarged to enclose a worm gear 29 that has splines 30 on its inner circumference to fit snugly on the splines 31 on the end of the cam shaft. A worm 32, which meshes with the teeth of the worm gear, is also mounted in the enlarged end 28 on an axle 33 that is an integral part of the worm. The axis of the worm and its axle is perpendicular to the axis of the cam shaft 18, and the axle 33 has an integral, polygonal head 34 that extends through one side of the slack adjuster to be accessible for rotation to adjust the slack. Since the worm gear 29 has a fixed angular position on the cam shaft, rotation of this gear, although it is at most only a few degrees for each rotation of the worm, shifts the angular position of the slack adjuster 27 by the same few degrees relative to the cam shaft 18.

It is important that the worm rotate only when the slack is being adjusted, and in order to prevent it from rotating at other times, a sliding, non-rotatable, tubular lock 36 surrounds the axle 33. The inner surface of the outer end of the lock has a polygonal configuration that just fits the polygonal head 34, which is hexagonal on most slack adjusters, and the lock is pushed outward by a spring 37 to fit sufficiently far onto the head to prevent rotation thereof. When it is desired to rotate the worm to adjust the slack, placing a socket (not shown in this figure) of the proper size on the head 34 depresses the spring and forces the lock 36 into an annular recess in body of the slack adjuster, freeing the head 34 to be rotated by the socket to adjust the angular position of the slack adjuster 27 relative to the cam shaft. In all slack adjusters there is a similar adjusting head, and these heads are located at only certain places on the respective slack adjusters, one such place being on one side of the slack adjuster at a predetermined offset from the axis of the worm gear.

An air chamber 38 connected to a source (not shown) of compressed air provides the force to pivot the slack adjuster lever 27, the cam shaft 18, and the S-cam 17 to force the roller pins 16a and 16b apart and thereby force the brake linings 14a and 14b against the bake drum 11. The force of the compressed air is applied against a piston (not shown) within the chamber to force the piston and a push rod 39 connected to it to the left in FIG. 2. The end of the push rod is rigidly connected to a clevis 41 pivotally attached to the slack adjuster by means of a clevis pin 42 that passes through a hole near the smaller end 43 of the arm 44 of the slack adjuster 27 remote from the larger end 28 where the worm gear 29 is located. Foundation brake systems are typically of such a size that the proper longitudinal movement of the push rod is about ½" to ¾" between the position in which it is retracted farthest into the air chamber and the position that the push rod is in when the brake linings engage the brake drum 11.

Figure 3:
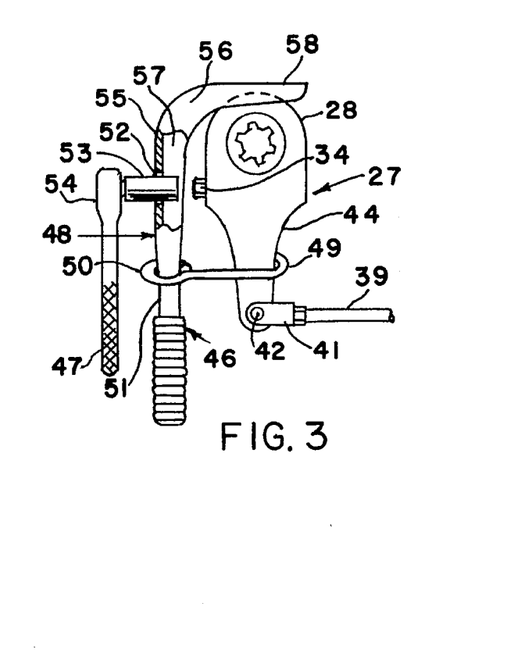
FIG. 3 shows a slack adjuster check tool according to this invention with a manual slack adjuster of the type shown in FIG. 2.

FIG. 3 shows a slack adjuster check tool 46 placed on the slack adjuster 27 in position to check the amount of slack. The tool includes a handle 47 and a holding member 48 extending from it. The holding member is so named because it holds a slack adjuster while the slack is being measured and, if necessary, adjusted. The holding member is curved to extend alongside the larger end 28 of the slack adjuster and then over that end and, in this embodiment, is provided with a hook 49 to extend far enough around the arm 44 to retain the tool in place on the slack adjuster 27. One end of the hook is formed into a ring 50 rotatably attached to the slack adjuster check tool in the region where one end portion 51 of the holding member is attached to or extends from one end of the handle. This end portion has an opening 52 located to be directly in line with the adjusting head 34 and large enough to permit a socket 53 of the proper size held in a socket wrench 54 to fit over the head to pass through. As shown, the check tool is almost, but not quite, in position to adjust the slack adjuster. When it is fully in position, the adjusting head can fit in the hole 52, still leaving enough room between the perimeter of the head 34 and the hole for the socket to be placed on the adjusting head.

In the region of the opening 52, the cross-sectional configuration of the holding member 48 is U-shaped as defined by a central portion 55 in the form of a strap and two side flanges 56 and 57, one on each side of the central strap and spaced far enough apart to embrace the larger end 28 of the slack adjuster 27 in the direction of the longitudinal direction of the axis of the worm gear 29. Part of the flange 56 has been broken away, along with part of the central strap, to make the hole 52 visible. In this broken-away part, the flange 57 parallel to the flange 56 is also visible.

It may also be observed, particularly in the region where the flange 56 is broken away, that the central strap 55 and both flanges 56 and 57 are bent or curved so that the other end portion 58 of the holding member 48 is at approximately a 90° angle to the end portion 51, and the location of the opening 52 is the same distance from the bend between the end portions 51 and 58 as the distance from the end 28 of the shack adjuster 27 to the location of the adjusting head 34.

In order to check on the amount of slack in the brake system, the slack adjuster check tool 46 is placed in the position shown and the hook 49 is swung into engagement with the arm 44. Then the handle 47 is pulled in the direction away from the push rod 39, causing the arm 44 to be pulled along with the slack adjuster check tool. If there is so much slack that the pin 42 moves more than the proper distance of about ½" to about ¾", the socket 53 must be inserted through the opening 52 and placed on the adjusting head 34, and the socket wrench must be turned in the proper direction to limit the slack to that distance. Or, if the brake linings have just been changed and there is too little slack, thereby causing that brake to be applied too soon, the socket wrench will have to be rotated in the opposite direction to increase the slack so that the pin 42 (or any other suitable indicating point on the slack adjuster 27) moves the proper distance.

Figure 4:
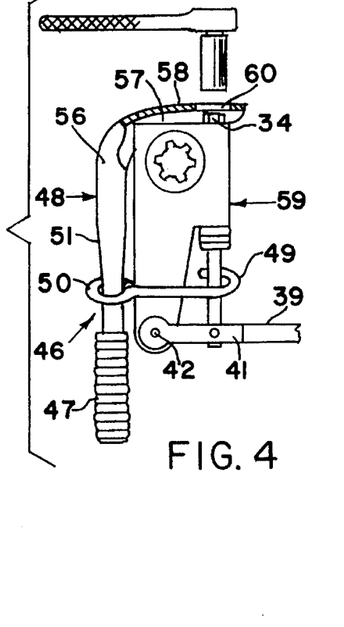
FIG. 4 shows the slack adjuster check tool of FIG. 3 with an automatic slack adjuster.

FIG. 4 shows the slack adjuster check tool 46 almost in place to check the slack on an automatic slack adjuster 59 but is slightly displaced from contact with the slack adjuster to make it easier to see some of the features. Insofar as this invention is concerned, the only difference between an automatic and a manual slack adjuster is in the location of the adjusting head 34. In the slack adjuster 59 the adjusting head 34 is on the end of the slack adjuster rather than on the side, and for this purpose, the slack adjuster check tool 46 is provided with a second opening 60, which can be seen in the end portion 58 by virtue of the fact that a portion of the flange 56 and the strap 55 is shown broken away to reveal this opening. The location of this opening is determined with respect to the bend between the end portions 51 and 58 to be at the standard position for access to those adjusting heads 34 that are mounted on the end surface of slack adjusters.

The adjusting head 34 of an automatic slack adjuster does not have to be adjusted as often as the head on a manual slack adjuster, but it does have to be adjusted sometimes, and the procedure is essentially the same as was just described in connection with FIG. 3.

The installations of the slack adjusters 27 and 59 permit the handle 47 of the slack adjuster check tool to point down, and the whole slack adjuster check tool 46 is shown to be retained in place by cooperation between the hook-shaped, or bent, holding member 48 and the hook 49 that serves as a retention member. The slack can be measured by pulling the downwardly extending handle in the direction away from the air chamber, which will draw the arm 44 along with it.

Figure 5:
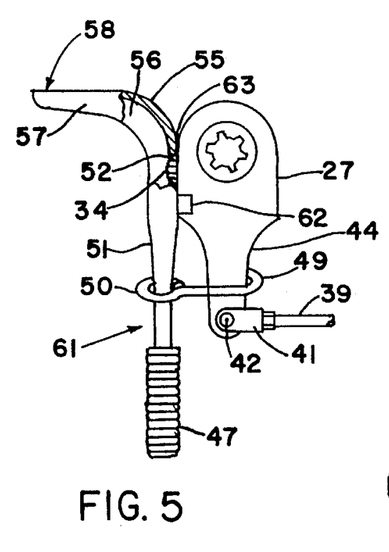
FIG. 5 is a side elevational view of a different embodiment of a slack adjuster check tool arranged for making a quick check of the slack.

While the curve in the holding member 48 makes it possible for the slack adjuster check tool to hang on the slack adjuster with the assistance of the retention member, whether the latter be a hook or chain or other configuration, there are times when all that is desired is to check the slack quickly and not to leave the tool in place while adjusting the slack. A slack adjuster check tool 61 shown in FIG. 5 is suitable for such use. It has a pair of flanges 62 and 63 on the back side of the holding member 48, i.e., on the side that would normally be facing away from a slack adjuster while checking the slack. Only the end portion 51 of the holding member 48 extending from the handle 47 is needed; the curve and the other end portion 58 of the holding member 48 can be eliminated. The small flanges 62 and 63 are spaced far enough apart to embrace the slack adjuster 59, just as the flanges 56 and 57 are, and part of the flange 62 and of the central strap 55 have been broken away to show that the opening 52 has been retained to receive the adjusting head 34.

Figure 6:
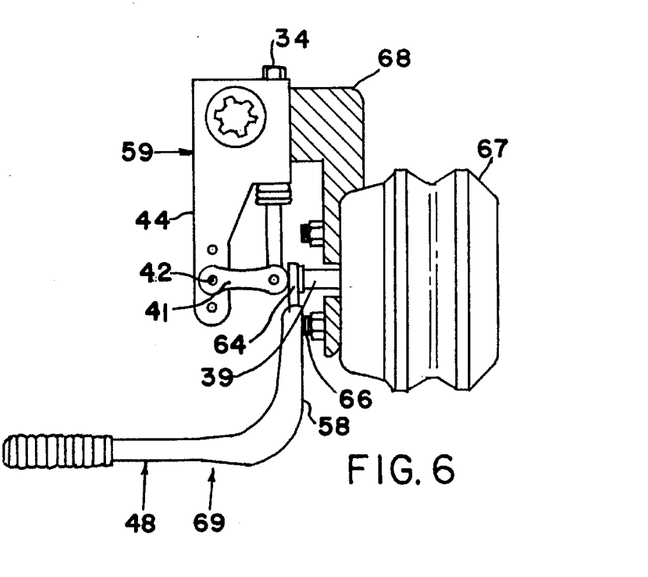
FIG. 6 shows a modified slack adjuster check tool positioned to engage a different part of an automatic slack adjuster.

There are some installations, such as that illustrated in FIG. 6, in which the end portion 58 of the holding member 48 cannot be inserted in such a way as to enclose any part of the larger end of the slack adjuster 59. In such installations, the slack adjuster check tool 46 may have to be modified by the addition of a slotted projecting member 64 shown in FIG. 7. This member has a split end into which the push rod 39 of an air chamber can fit. Then, some part of the brake system, such as one of the large studs 66 extending from an air chamber 67 and used to mount the air chamber on a bracket 68 can be used as a fulcrum against which the convex back surface of the end portion 58 can be pivoted to lever the clevis 41 and the push rod 39, which fits into the slot in the end of the member 64, to the left to check the slack.

Figure 7:
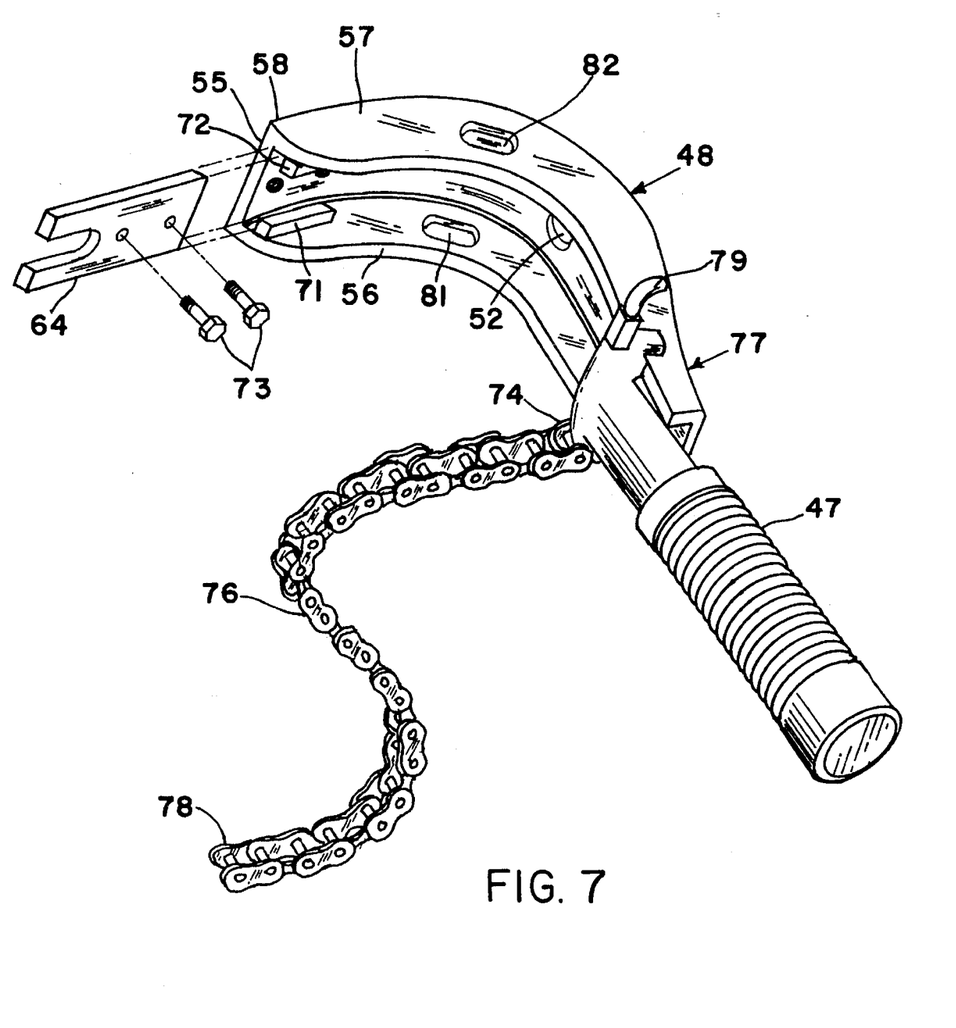
FIG. 7 is a perspective, exploded view of another embodiment of a slack adjuster check tool according to this invention.

One way for attaching the member 64 to a slack adjuster check tool, such as the tool 69 shown in FIG. 7 is to attach runners 71 and 72 to the flanges 56 and 57, respectively, to provide a receiving space between these runners and the under surface of the central portion 55. The member 64 is held in place by any convenient means, such as a pair of machine screws 73 after the member 64 has been slid into its correct position with respect to the end portion 58. Alternatively, the runners 71 and 72 can be long enough to allow the member 64 to be slid farther back along the underside of the end portion 58 when not in use. In that case, the member can be shaped so that it can slide as far forward as necessary to project the required distance from the end portion 58 only when the slack adjuster to be checked is so arranged as to require the use of the member 64.

Figure 8:
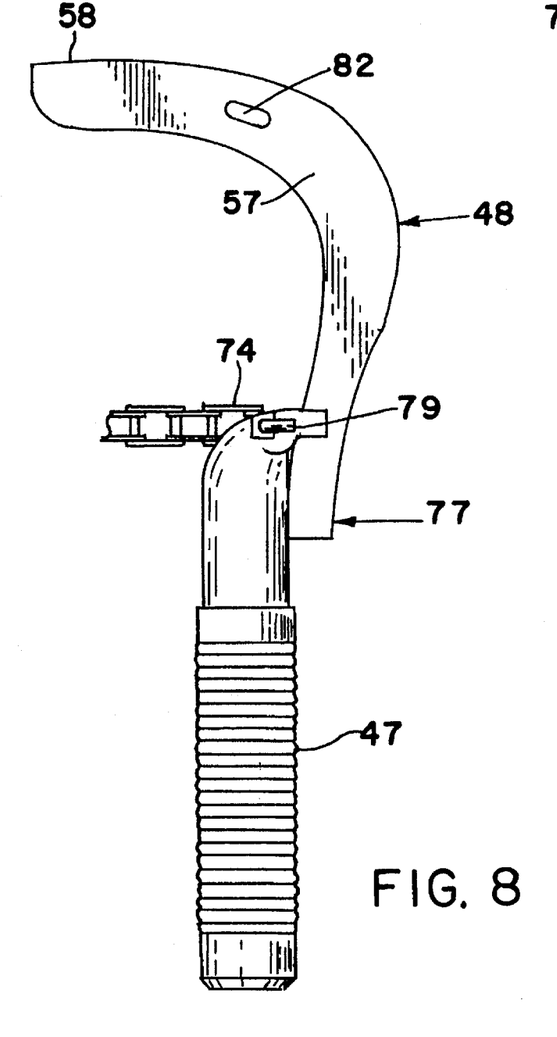
FIG. 8 is a side elevational view of the slack adjuster check tool of FIG. 7.
Figure 9:
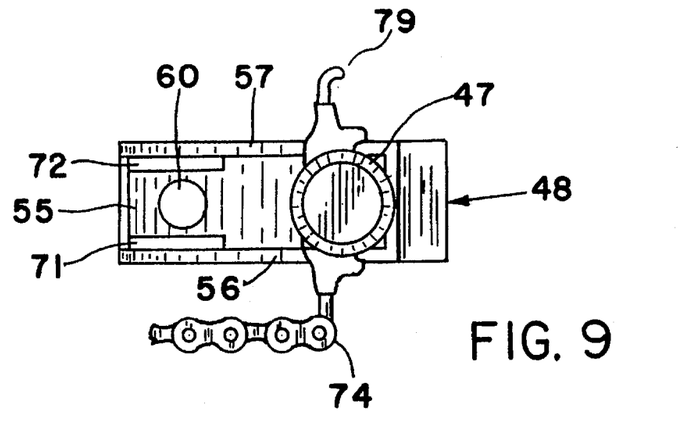
FIG. 9 is a view from the handle end of the slack adjuster check tool of FIGS. 7 and 8.

Instead of using a hook to retain the slack adjuster check tool in place on a slack adjuster, FIGS. 7–9 show a modified embodiment in which one end 74 of a chain 76 is welded or otherwise firmly attached to a slack adjuster check tool 77. The chain is long enough to encircle the arm of any slack adjuster, such as the slack adjuster 27 in FIG. 3 or an automatic slack adjuster of which the slack adjuster 59 in FIG. 6 is one example. The free end 78 of the chain or any appropriate link of the chain can be hooked onto a projection 79 to secure the check tool 77 on a slack adjuster after the portion of the chain 76 between the link so hooked and the chain has been placed around the arm of the slack adjuster.

As may be seen, the chain 76 is of the type used for power transmission, such as in bicycles, motorcycles, and automobiles. In this type of chain, which is the preferred type, pairs of flat links are joined together by cylinders that allow each link to pivot in only one plane relative to the next link. The free end 78, or any link between the free end and the end 74, may, after looping the chain around the arm 44, be placed over the projection 79 rigidly attached to the slack adjuster check tool 77 and preferably bent away from the direction in which the end portion 58 of the tool extends. It is essential that the chain 76 be strong enough to stand up under the force that will be applied to the handle 47 when testing the amount of slack.

It will be noted that the holding member 48 on the slack adjuster check tool 77 includes the central portion 55 and the two parallel flanges 56 and 57 extending from its opposite edges. The end portion 51 of the holding member 48 is welded to the handle in this embodiment, although it would be possible to form the holding member and the handle as integral parts of one member, for example, by forging. In addition, it is not essential that the strap be formed of a piece of flat metal; the holding member 48 could have a curved cross section, like a U. In addition, the flanges 56 and 57 do not need to extend the entire length of the holding member; they could be only a fraction as long, provided they were spaced far enough apart to embrace the larger end 28 (FIG. 3) of a slack adjuster.

The holding member in FIG. 7 includes the openings 52 and 60 through which an adjusting socket can pass to reach the adjusting head 34 of a slack adjuster, as described in connection with FIGS. 3 and 4, for example. The flanges 56 and 57 also are shown as having openings 81 and 82 for access to other adjusting heads on some slack adjusters.

Figure 10:
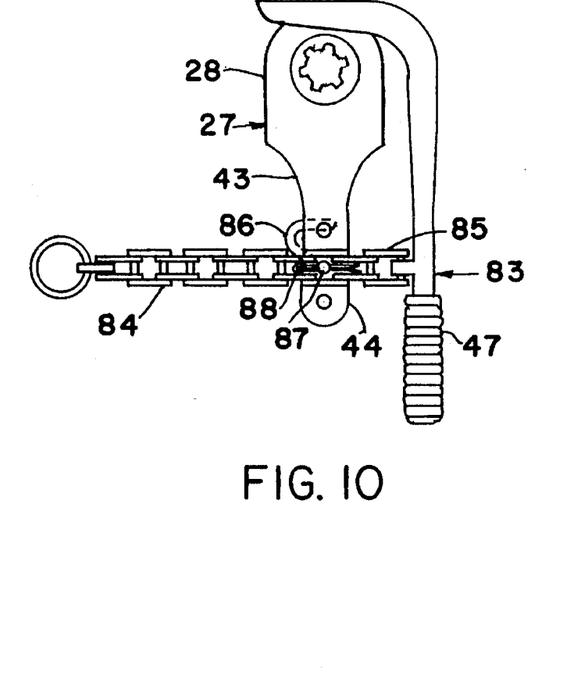
FIG. 10 shows another embodiment of a slack adjuster check tool with a different retention chain arrangement attached to a slack adjuster.
Figure 11:
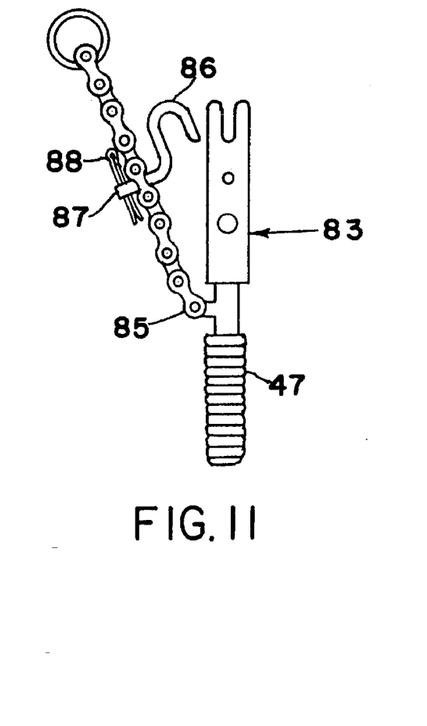
FIG. 11 is a view of the rear side of the tool in FIG. 10.

FIG. 10 shows another embodiment of a slack adjuster check tool 83 similar to the tool 77 in FIGS. 7–9 in that it has a chain 84 for a retention means to hold the tool attached to the slack adjuster 27 by grasping the arm 43. While one end 85 of the chain is secured to the tool 83, for example by being welded to it, the chain 84 does not encircle the arm. Instead, it has a hook 86 attached to it to hold the arm 43 while the slack is being checked and, if necessary, adjusted. The hook, as shown in FIG. 11, has a shaft 87 that extends through any of the open spaces in the chain 84 and is kept in place on the chain by a cotter pin 88 or a similar device. The hook may be placed at any point along the chain that allows sufficient length between the end 85 and the hook to hold onto the slack adjuster securely.

Figure 12:
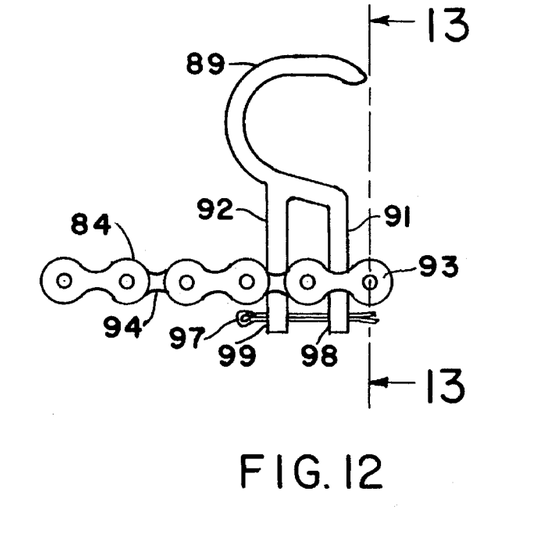
FIG. 12 is an enlarged side view of a hook suitable for use on the slack adjuster check tool of FIG. 10.
Figure 13:
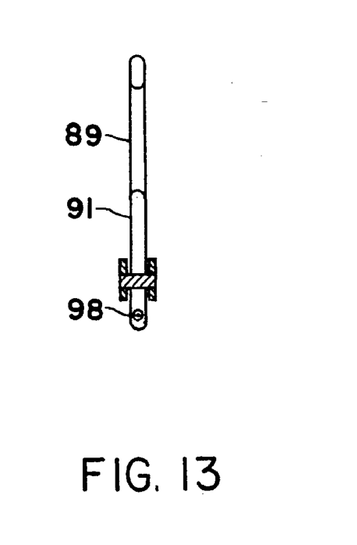
FIG. 13 is an end view of the hook in FIG. 12, partly in cross section along the line 13—13' in FIG. 12.

FIGS. 12 and 13 show another form of hook 89 similar to the hook 86 but has two shafts 91 and 92 parallel to each other and spaced far enough apart to be aligned with spaces in links of the chain 84. The shafts 91 and 92 are shown aligned with adjacent links 93 and 94, but it is not necessary that the links be that close together. The ends of the shafts 91 and 92 pin 96 are not bent apart as is usually the case with cotter pins. Instead, they are resilient and are only slightly splayed out at the region 97 so that they can be forced through aligned holes 98 and 99 in the shafts 91 and 92 will then spring back to the shape shown in FIG. 12 to prevent their falling out of the shafts.

The invention has been described with reference to specific embodiments and materials and components, but it will be obvious to those skilled in the technology involved that the embodiments, materials, and components may all be modified without departing from the true scope of this invention.

What is claimed is:

1. A tool for testing the setting of a slack adjuster in an S-cam air brake system for a wheel rotatably mounted on an axle, the brake system including brake shoe means, an air chamber mounted in a first fixed position relative to the axle, a push rod extending from the air chamber to be moved longitudinally out of the chamber in response to the introduction of compressed air into the chamber, a cam shaft mounted in a second fixed position relative to the axle, the S-cam being rigidly attached to one end of the cam shaft to be rotated thereby in a first direction through an angular slack motion range and beyond the end of that range to apply braking force to the brake shoe means, the other end of the cam shaft being splined, the slack adjuster including a lever having a first side facing the air chamber and a second side facing away from the air chamber, the lever also having first and second ends, the first end enclosing a splined worm gear that fits onto the splined end of the cam shaft to transmit rotational force thereto, the slack adjuster further including a worm meshingly engaging the worm gear to adjust the relative angular position of the lever on the cam shaft to control the amount of slack movement, and wrench-adjustable means accessible outside the lever in a predetermined location to modify the setting of the worm, the push rod being attached to the lever from the first side thereof to push the lever in the first direction, said tool comprising:

(a) a handle;
   (b) a holding member comprising:
   (i) a first end portion joined to the handle and extending in a first direction therefrom,
   (ii) a second end portion joined to the first end portion and extending in different direction, to permit the holding member to embrace at least part of the first end of the slack adjuster, and
   (iii) flange means to extend alongside the first end of the slack adjuster to help retain the tool in engagement with the slack adjuster;
   (c) retention means attached to the tool adjacent the handle to engage the slack adjuster adjacent the second end thereof to transmit to the second end force applied to the handle to urge the second end in the one direction to the end of the slack movement; and
   (d) access means extending through the holding member to permit a wrench to extend through the access means to engage the wrench-adjustable means to modify the setting of the worm to set the angular extent of the slack motion range.

2. The tool of claim 1 in which the first and second end portions of the holding member are approximately 90° apart.

3. The tool of claim 1 in which the holding member comprises a curved portion joining the first and second end portions of the holding member together.

4. The tool of claim 3 in which the flange means extend from the entire length of the curved portion.

5. The tool of claim 1 in which the holding member comprises a curved strap bent to define the first and second end portions, and the flange means extend from both edges thereof.

6. The tool of claim 1 in which the retention means comprises a hook attached to the tool adjacent the handle to engage the first side of the slack adjuster adjacent the second end thereof to transmit to the second end force applied to the handle to pull the second end in the one direction to the end of the slack movement.

7. A tool for testing the setting of a slack adjuster in a foundation air brake system for a wheel rotatably mounted on an axle, the brake system comprising an air chamber mounted in a first fixed position relative to the axle, a push rod extending from the air chamber, a cam shaft having a axis parallel to the axle, an S-cam rigidly attached to one end of the cam shaft to be pivoted by in a first direction through an angular slack motion range and beyond the end of that range to apply braking force, the slack adjuster including a lever engaging the push rod and having a first side facing the air chamber and a first end enclosing a splined worm gear fitted onto the splined end of the cam shaft to rotate the cam shaft in response to longitudinal movement of the push rod, the slack adjuster having first and second surfaces spaced apart in the longitudinal direction of the cam shaft and wrench-adjustable means accessible outside the lever in a predetermined location to modify the angle of the lever relative to the cam shaft to control the angular extent of the slack motion range, said tool comprising:

(a) a handle;

(b) a holding member extending from the handle to engage a slack adjuster, the holding member comprising flange means engaging the first and second surfaces of the slack adjuster to help guide the tool into proper engagement with the slack adjuster;

(c) retention means attached to the tool to retain the tool in place on the slack adjuster when the holding member is engaged with the slack adjuster and to transmit to the second end force applied to the handle to pull the second end in the one direction from a relaxed position to the end of the slack movement; and (d) access means in the holding member to permit a wrench to extend through the access means to engage the wrench-adjustable means to modify the setting of the worm.

8. The tool of claim 7 in which the retention means comprises:

(a) a chain attached to the tool; and (b) hook means attached to the chain far enough from the tool to hook onto the lever.

9. The tool of claim 7 in which the retention means comprises:

(a) a chain comprising a plurality of links flexibly movable in only one plane and having one end affixed to the tool; and (b) hook means to engage the chain at a selected position, the length of that portion of the chain between the one end and the selected position being long enough to extend around the lever, whereby a pulling force can be applied from the handle through the chain to the lever to pull the lever through the slack motion range.

10. The tool of claim 7 in which the retention means comprises hook means mounted on the tool to swivel around the tool.

11. A tool for testing the setting of a slack adjuster in a foundation air brake system for a wheel rotatably mounted on an axle, the brake system comprising an air chamber mounted in a first fixed position relative to the axle, a push rod extending from the air chamber, a cam shaft having a axis parallel to the axle, an S-cam rigidly attached to one end of the cam shaft to be pivoted by in a first direction through an angular slack motion range and beyond the end of that range to apply braking force, the slack adjuster including a lever engaging the push rod and having a first side facing the air chamber and a first end enclosing a splined worm gear fitted onto the splined end of the cam shaft to rotate the cam shaft in response to longitudinal movement of the push rod, the slack adjuster having first and second surfaces spaced apart in the longitudinal direction of the cam shaft and wrench-adjustable means accessible outside the lever in a predetermined location to modify the angle of the lever relative to the cam shaft to control the angular extent of the slack motion range, said tool comprising:

(a) a handle;

(b) a bent holding member having a first end attached to and extending from the handle;

(c) slotted means at the second end to engage a slack adjuster; and (d) access means in the holding member to permit a wrench to extend through the access means to engage the wrench-adjustable means to modify the setting of the worm.

12. The tool of claim 11 in which the slotted means comprises a plate slotted at one end to receive the push rod, the second end of the holding member comprising sliding receptacle means to receive the other end of the plate.

13. The tool of claim 11 in which the holding member is curved to define first and second end portions angularly displaced from each other, and each of the end portions has separate ones of the access means therethrough in predetermined locations corresponding to the wrench-adjustable means of different slack adjusters.

* * * * *